United States Patent [19]

McDowell

[11] 4,308,773

[45] Jan. 5, 1982

[54] METHOD FOR SHEARING AND SEPARATING BATTERY GRIDS

[75] Inventor: Jerry T. McDowell, Greeneville, Tenn.

[73] Assignee: Ball Corporation, Muncie, Ind.

[21] Appl. No.: 130,315

[22] Filed: Mar. 14, 1980

Related U.S. Application Data

[62] Division of Ser. No. 949,938, Oct. 10, 1978, Pat. No. 4,241,629.

[51] Int. Cl.³ .......................... B23D 25/12; B26D 1/56
[52] U.S. Cl. ............................................ 83/37; 83/47;
83/13; 83/343; 83/920; 83/39
[58] Field of Search ................. 83/37, 47, 13, 44, 343,
83/302, 920, 408, 39

[56] References Cited

U.S. PATENT DOCUMENTS

| | | | |
|---|---|---|---|
| 1,345,099 | 6/1920 | Overbury | 83/47 X |
| 1,481,193 | 1/1924 | Fischer | 83/47 X |
| 3,578,761 | 5/1971 | Sarka | 83/343 |
| 3,774,485 | 11/1973 | Kercher | 83/13 |
| 3,964,356 | 6/1976 | Dineen | 83/44 X |

*Primary Examiner*—Donald R. Schran
*Attorney, Agent, or Firm*—Gilbert E. Alberding

[57] ABSTRACT

The subject invention is related to a cutting apparatus for forming individual battery grid structures from a sheet material having cut out portions thereon, the apparatus comprising spaced apart first and second rotatable devices, a plurality of leading knives carried by said first device, a plurality of trailing knives carried by said second device, the knives arranged to cut transversely of the material forming shear lines from the edge of the sheet material to the cut out portions of the material, a plurality of blades carried by said first and second rotatable device for cutting longitudinally of the sheet material along a slit line between adjacent cut out portions of the sheet material, the knives and blades being spaced about the periphery of the first and second rotatable devices and arranged to cooperate to sectionalize and form thereby individual battery grid structures from the sheet material.

3 Claims, 4 Drawing Figures

METHOD FOR SHEARING AND SEPARATING BATTERY GRIDS

This is a division of application Ser. No. 949,938, filed Oct. 10, 1978, now U.S. Pat. No. 4,241,629.

BACKGROUND OF THE INVENTION

This invention relates to methods and apparatus for cutting a continuous expanded lead battery grid structure and finds adaptation in the battery grid industry, and in particular, relates to the formation of individually pasted battery grid structures produced therefrom.

The subject invention specifically is addressed to the manufacture of individual storage battery grids having active material embedded within the grid network thereof. Such grid structures are generally made by expanding a metal sheet to form an open network structure and thereafter applying paste thereto by means readily available in the art.

The step of expansion in the process to form the expanded structure may be readily made by conventional processes, such as disclosed in U.S. Pat. No. 3,891,459. After expansion, pasting of the expanded structure is accomplished by moving it into a zone where an active material, generally a thick, lead-containing paste, is applied to the grid network. Various means may be used to apply the active material to the expanded structure. In order to deliver a uniform charge for distribution upon and into the open network of the grid without materially deforming the same, pasting machines are utilized and are generally of the so-called Lund or fixed orifice type or the Winkel or belt type. In the Lund type, a strip of battery paste is fed between a pair of rollers rotating to apply pressure to the grid, the paste being thereby forced into the grid structure. In the Winkel belt type, the grids are fed horizontally on a belt under a roller where the battery paste is applied. Pasting machines have also been developed that use ultrasonic energy to convert battery pastes from their normally nonflowable form to a flowable form. After the expanded structure is subjected to the direct and continuous charge of paste, the pasted grid is moved into a wiping or leveling zone where a doctor blade or the nip of a set of spaced apart rollers produce a uniform paste distribution. In this fashion the paste is compressed by mechanical forces into the interstices of the network, the leveling being such as to merely allow the grid structure itself to freely pass through the zone and undergo only minimum, if any, deformation. Thereafter, the pasted grid is subjected to a drying operation to thereby affix the paste to the network. In a commercial operation, the production of grids is generally made from a large length of sheet material so that there are a multiplicity of grid structures thereon comprising expanded and unexpanded portions. After drying, the structures must be subjected to a separation or cutting operation to sectionalize and set free the individual grids for further processing. Since such structures are more or less in a delicate state, any slitting or cutting must be carefully done so as not to cause loss of paste from the pasted network. It will be appreciated that the battery grids are easily deformable and may lose their character if adequate means are not employed to handle them. Any undue treatment would cause disruption or loss of paste and, therefore, rejection of the grid structure.

Briefly, in accordance with this invention, a cutting apparatus for forming individual battery grid structures from a sheet material having cut out portions therein, said cutting apparatus comprising spaced apart first and second rotatable means, a plurality of leading knives carried by said first means, a plurality of trailing knives carried by said second means, said knives arranged to cut transversely of said material forming shear lines from the edge of said sheet material to the cut out portions of said material, a plurality of blades carried by said first and second rotatable means for cutting longitudinally of said sheet material along a slit line between adjacent cut out portions of said sheet material, said knives and blades being spaced about the periphery of said first and second rotatable means and arranged to cooperate to sectionalize and form thereby individual battery grid structures from said sheet material.

The aforementioned features with the objects and advantages which become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

An example of the invention is illustrated in the accompanying drawings in which.

SUMMARY OF THE INVENTION

It has been found in accordance with this invention that a rather unique yet simplistic design and construction afford a highly useful means for sectionalizing a sheet or web material of pasted grid structures with an attendant feature of maintaining the integrity of each grid thereof.

It is accordingly an object of the present invention to provide a cutting device having a few functional parts and of unitary and economic construction.

It is another principal object of the invention to provide a device of the character herewithin described which has means for cutting a continuous strip of expanded material transversely and longitudinally of said material for use in conventional battery manufacturing operations.

It is still another object of this invention to provide means for a commercial, lead-base battery facility, the means providing proper formation of individual battery grid structures having pasted portions thereon.

These and other objects of the invention will become more readily apparent from a review of the specification, claims and a study of the attached drawings.

DETAILED DESCRIPTION OF THE INVENTION

Figure 4:
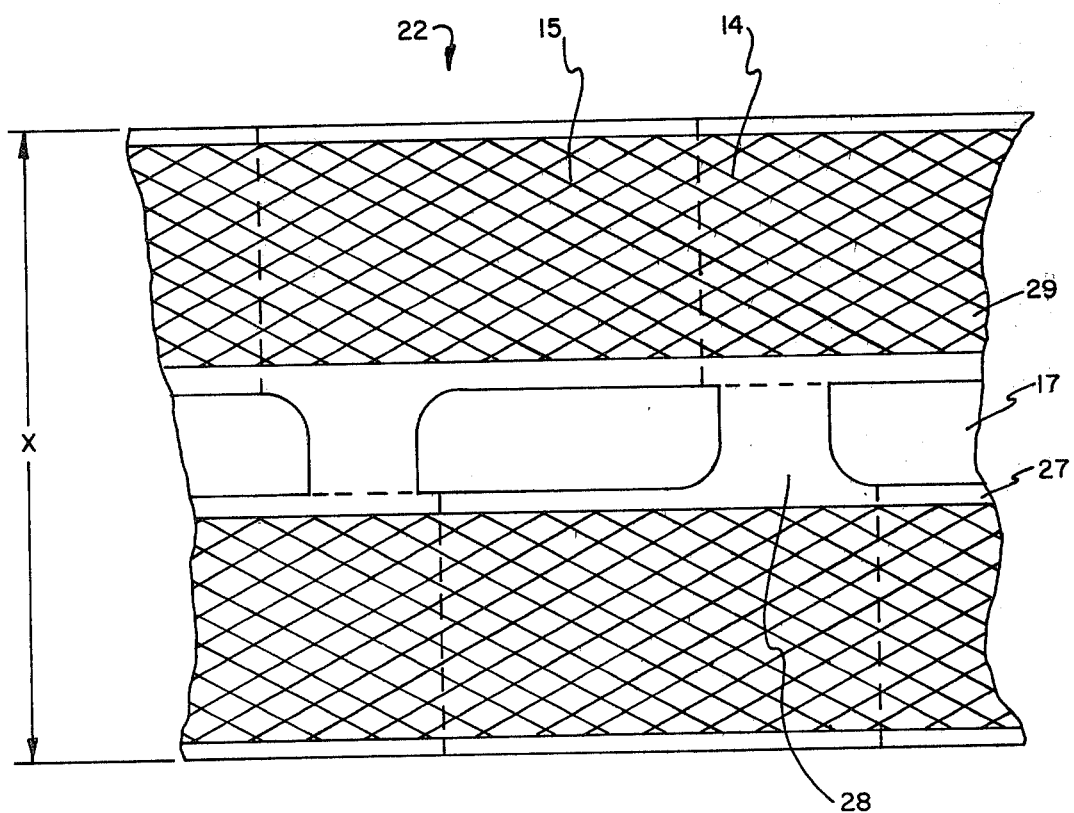
FIG. 4 is a plan view of unsectionalized grid structures.

Referring now more particularly to the accompanying drawings, 10 indicates generally a conventional battery grid line along with the essential features of the instant invention. The grids are made initially from an unexpanded metal strip 11 of metal, such as lead or lead-base alloys, drawn from a pay off roll 12 and is conveyed to a conventional expanding machine 13 in which the strip 11 is expanded to form a grid structure 22 by reciprocating slitting and expanding cutters (not shown), the strip itself being advanced step by step lengthwise into the machine. Generally, the expanding machine 13 has its cutter situated to converge on the center of the strip in the direction the strip is advanced. There results from such an expansion operation the grid structure 22 having an open network comprising a plurality of skeletal, wire-like elements 14 (FIG. 4) connected one to the other by nodes 15, each node 15 and elements 14 extending diagonally through the grid structure in a more or less honeycomb fashion.

Following expansion, the expanded strip 22 is laid down into substantially the same plane as the original unexpanded strip 11 from which it was formed by advancing the strip 22 through leveling rollers 18 located near the exit end of the expanding machine 13.

After leveling of the expanded strip, the strip is fed by spaced apart drive means 16 into a scrap removal and flattening die apparatus 23. In this operation a cut out section 17 is formed and the pieces so cut out are removed from the strip, this being readily accomplished by a punch and die arrangement (not shown) for the specific cut out configuration desired. At the same time the expanded strip 22 is subjected to this cut out operation, the grid structure is likewise flattened to a fixed, predetermined grid thickness and the elements are turned or rotated to a desired angular moment. Moreover, the flattening die is so designed that during the flattening operation, the strip is confined to a specified dimension indicated as x in FIG. 4 and, therefore, the grid strip is perfectly sized to a predetermined width.

After removal of the scrap portion with flattening and sizing thereof, the grid strip is conveyed to the next operation and is there ready for pasting via pasting machine 16. The pasting machine may be flush pasted or belt pasted using conventional pasting techniques as is well-known in the art. The pasted grid structure is thereafter cured or dried by a conventional drying oven 19. The dried grid structure is then advanced to the plate separator 22 device of the subject invention.

Figure 1:
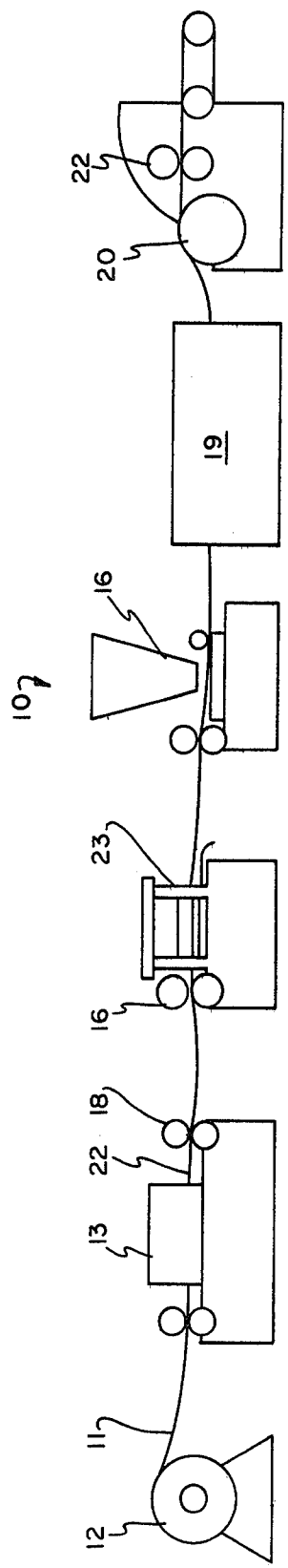
FIG. 1 is a schematic flow diagram.
Figure 2:
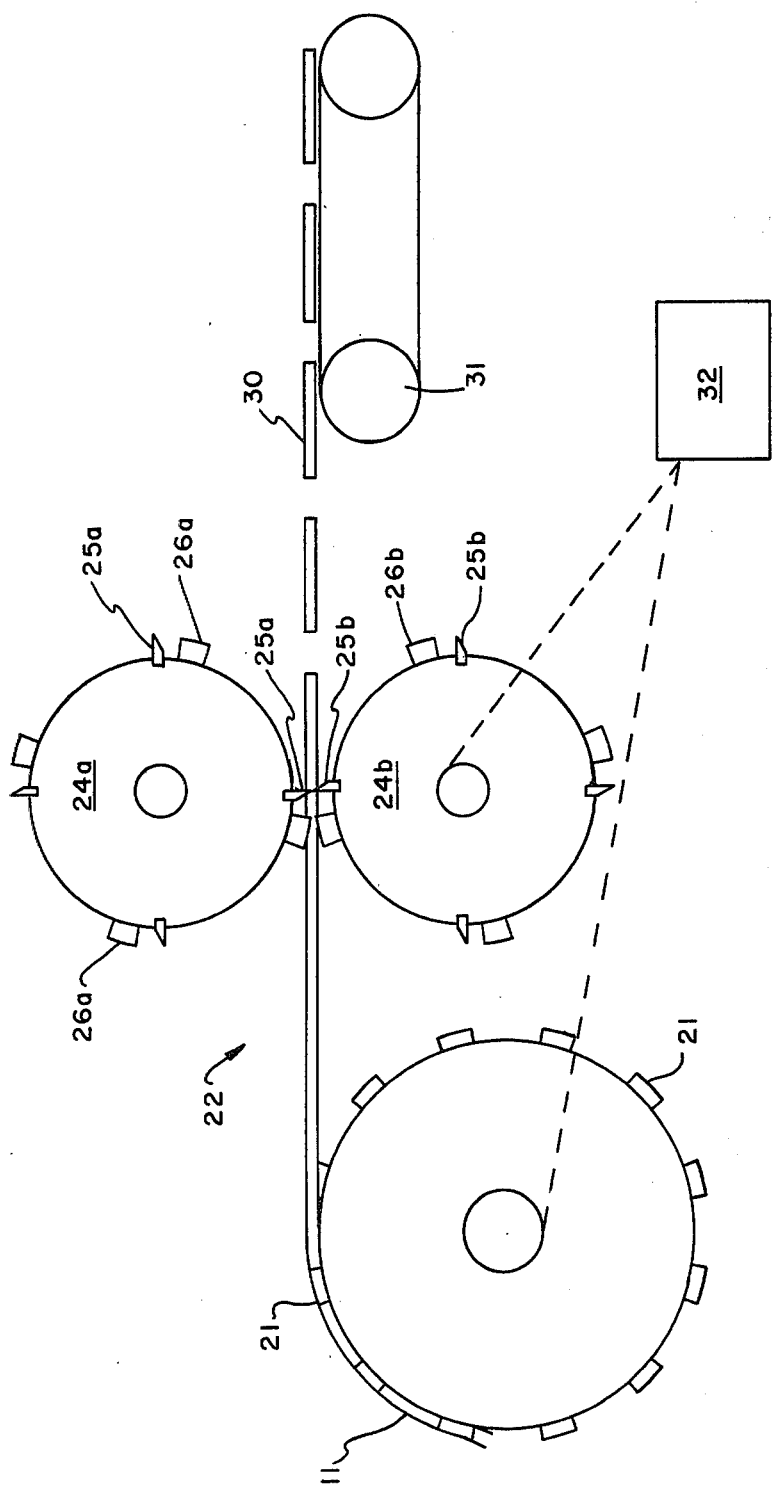
FIG. 2 is an enlarged, front elevational view of the subject devices.

It will be noted from FIG. 2, which is a more detailed drawing of the plate separator apparatus of the subject invention, that the apparatus comprises a feed wheel 20 upon which passes the dried grid structure 11, said structure engaging drive lugs 21 affixed to said feed wheel 20. Then the drive lugs engage the cut out portions of the strip and advance the strip directly in the cutting device 22.

Figure 3:
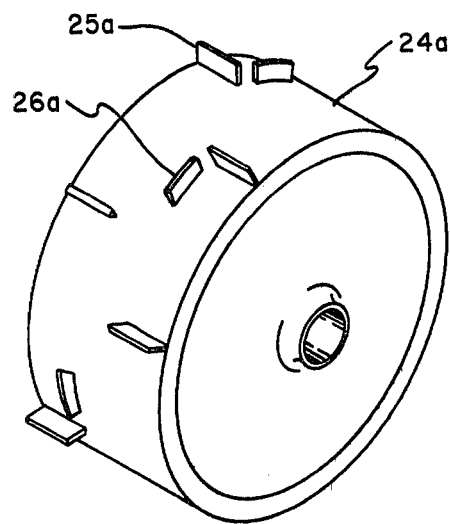
FIG. 3 is a view of one of the subject cutting tools.

The cutting device 22 comprises a plurality of radially extending knives 25 that are mounted to an upper and lower rotary drum 24a and 24b, respectively. The radially extending knives 25 are spaced apart and extend around the periphery of each rotary drum, the spacing of the knives being provided as desired. In FIG. 2, four leading knives 25a are shown affixed to the upper rotary drum 24a with corresponding trailing knives 25b in the lower rotary drum 24b. The radially extending knives 25 are themselves mounted on the drums in any known manner and rotate therewith. As clearly seen in the drawing the drums are also provided with blades 26a and 26b secured to the upper and lower drums, respectively, and are spaced from each other in a more or less staggered pattern and are spaced apart from the aforementioned knives 25a and 25b. The drums are rotatably mounted via shaft (not shown). A conventional motor 32 may be used to drive the plate separator. The surface speed for the drum 24 should be adjusted so that its surface speed equals that of the feed wheel 20. FIG. 3 shows drum 24a with knives 25a and blades 26a thereon.

In operation, after the expanded grid has been punched, pasted and dried it is advanced to the separation area which comprises the feed wheel and the rotary cutting apparatus. The grid is advanced to the feed wheel whereon the cut out portions of the grid strip are taken up by a series of lugs affixed to the feed wheel. Thereafter, the grid strip is conveyed along a belt positioned adjacent the feed wheel to accept the strip and adapted to travel at a predetermined speed. Upon leaving the conveyor the strip passes into the nip of the rotary drum cutters. The arrangement of the cutting members are such that alternate cuts are inflicted upon the strip during its travel and are made from the peripheral of the strip toward the void or cut out portion of the strip with subsequent cutting concurrently taking place longitudinally between cut out sections. In this fashion the grid structures are separated from the strip in a continuous manner and are taken up by a second conveyor into a stacking area.

It is advantageous if the knives and blades are made of high quality steel or carbide and that they be removably secured to their respective drums for ease of repair or change.

The preferred form of grid structure made in accordance with this invention is an individual structure 30 formed from an expanded lead-base metal strip and provided with a header 27 and a lug portion 28 of an unexpanded metal strip and an open network portion 29 of expanded metal, the open network being defined by wire-like elements 14 which have been pasted and sectionalized as aforementioned.

It is believed that a careful consideration of the specification in conjunction with the means of the drawings will enable the reader to obtain a clear and comprehensive understanding of the subject matter of the invention, the features and advantages, mode of use and improved result which is assured the user.

The foregoing is considered as illustrative only of the principles of the invention. Further, since a number of modifications and changes will readily occur to those skilled in the art, it is not desired to limit the invention to exact construction shown and described, and accordingly all suitable modifications and equivalents may be resorted to, falling within the scope of the invention as claimed.

What is claimed is:

1. A method of forming individual battery grid structures from a sheet material having pasted and unpasted portions with a plurality of spaced apart openings therethrough, said method comprising transversely shearing said sheet material from opposite sides along a line from the edge of the sheet material to one of the openings, said cutting transversely being staggered and extending inwardly from the edge to almost the center of the material, and subsequently longitudinally slitting said sheet material from opposite sides between two spaced apart openings whereby the shearing and slitting cooperates to sectionalize the pasted battery grid structure from said sheet material.

2. A method of forming individual battery grid structures from a sheet material comprising providing a sheet material with cut out portions thereon, transversely cutting said sheet material from opposite sides to form shear lines from the edge of said sheet material to the cut out portions, said cutting transversely being staggered and extending inwardly from the edge to almost the center of the material, and subsequently therewith longitudinally cutting said sheet material from opposite sides along a slit line between adjacent cut out portions of said sheet material, both cuttings cooperating to sectionalize and form thereby individual battery grid structures from said sheet material.

3. A method of forming individual battery grid structures from a sheet material having pasted and unpasted portions comprising advancing said sheet material by engaging a plurality of spaced apart voids situated centrally thereon, cutting transversely from opposite sides of said sheet material along a shear line from the edge to a void of said sheet material, said cutting transversely being staggered and extending inwardly from the edge to almost the center of the material, and cutting longitudinally from opposite sides of said sheet material along a slit line between adjacent voids, said cutting longitudinally being proximate the center of the material and spaced from and at right angle to every other transversal cutting.

* * * * *